(12) United States Patent
Sakai et al.

(10) Patent No.: US 8,601,873 B2
(45) Date of Patent: Dec. 10, 2013

(54) ANGULAR VELOCITY SENSOR

(75) Inventors: Minekazu Sakai, Kariya (JP); Tomoya Jomori, Kariya (JP); Takashi Katsumata, Kariya (JP)

(73) Assignees: DENSO CORPORATION, Kariya (JP); Toyota Jidosha Kabushiki Kaisha, Toyota (JP)

( * ) Notice: Subject to any disclaimer, the term of this patent is extended or adjusted under 35 U.S.C. 154(b) by 266 days.

(21) Appl. No.: 13/101,175

(22) Filed: May 5, 2011

(65) Prior Publication Data

US 2011/0271759 A1 Nov. 10, 2011

(30) Foreign Application Priority Data

May 10, 2010 (JP) ................................. 2010-108606

(51) Int. Cl.
*G01C 19/56* (2012.01)
(52) U.S. Cl.
USPC ..................................................... 73/504.12
(58) Field of Classification Search
USPC ..................................................... 73/504.12
See application file for complete search history.

(56) References Cited

U.S. PATENT DOCUMENTS

| | | | |
|---|---|---|---|
| 5,969,225 A | 10/1999 | Kobayashi | |
| 5,992,233 A | 11/1999 | Clark | |
| 6,067,858 A | 5/2000 | Clark et al. | |
| 6,250,156 B1 | 6/2001 | Seshia et al. | |
| 6,267,008 B1 | 7/2001 | Nagao | |
| 6,296,779 B1 | 10/2001 | Clark et al. | |
| 6,415,664 B2 | 7/2002 | Iwaki et al. | |
| 6,473,290 B2 * | 10/2002 | Mochida | 361/291 |
| 6,705,164 B2 | 3/2004 | Willig et al. | |
| 6,796,180 B2 | 9/2004 | Katsumata | |
| 7,762,134 B2 | 7/2010 | Katsumata | |
| 2001/0015101 A1 | 8/2001 | Iwaki et al. | |

(Continued)

FOREIGN PATENT DOCUMENTS

| | | |
|---|---|---|
| JP | A-2000-105124 | 4/2000 |
| JP | B2-3512004 | 1/2004 |

(Continued)

OTHER PUBLICATIONS

German Office Action dated May 10, 2012 issued from the German Patent Office in the corresponding German patent application No. 10 2011 075 428.8 (with English translation).

(Continued)

*Primary Examiner* — Hezron E Williams
*Assistant Examiner* — Gregory J Redmann
(74) *Attorney, Agent, or Firm* — Posz Law Group, PLC

(57) ABSTRACT

In an angular velocity sensor, a vibrator is coupled with a substrate through a beam part, and is movable in a first direction and a second direction that is perpendicular to the first direction. A driving part is configured to vibrate the vibrator in the first direction. A detecting part is configured to detect displacement of the vibrator in the second direction as a change in capacitance, the displacement being caused by Coriolis force generated in the vibrator due to vibration of the vibrator and an angular velocity around a third direction that is perpendicular to the first direction and the second direction. A restricting part is configured to restrict displacement of the vibrator in the second direction based on the change in capacitance. The angular velocity sensor is configured to satisfy a condition where $\beta \sin \theta$ is equal to or less than 1.

4 Claims, 4 Drawing Sheets

(56) References Cited

U.S. PATENT DOCUMENTS

| | | |
|---|---|---|
| 2002/0178814 A1 | 12/2002 | Katsumata |
| 2004/0149035 A1 | 8/2004 | Acar et al. |
| 2005/0081628 A1 | 4/2005 | Nozoe et al. |
| 2007/0131030 A1 | 6/2007 | Jeong et al. |
| 2008/0066546 A1 | 3/2008 | Katsumata |
| 2009/0056444 A1 | 3/2009 | Jeong et al. |
| 2009/0064781 A1 | 3/2009 | Ayazi et al. |

FOREIGN PATENT DOCUMENTS

| | | |
|---|---|---|
| JP | A-2005-43098 | 2/2005 |
| JP | A-2007-333642 | 12/2007 |
| JP | A-2008-14727 | 1/2008 |
| JP | B2-4337943 | 7/2009 |

OTHER PUBLICATIONS

Office Action mailed May 28, 2013 in corresponding JP patent application No. 2010-108606 (and English translation).

Office Action mailed Sep. 24, 2013 in the corresponding JP application No. 2010-108606 (English translation).

* cited by examiner

ANGULAR VELOCITY SENSOR

CROSS REFERENCE TO RELATED APPLICATION

This application is based on Japanese Patent Application No. 2010-108606 filed on May 10, 2010, the disclosure of which is incorporated herein by reference.

FIELD OF THE INVENTION

The present invention relates to an angular velocity sensor.

BACKGROUND OF THE INVENTION

Japanese Patent No. 3,606,164 (corresponding to U.S. Pat. No. 6,473,290, hereinafter referred to as the patent document 1) describes an angular velocity sensor that includes a substrate, a movable unit coupled with the substrate through a supporting beam, a comb-shaped movable electrode provided in the movable unit, and a comb-shaped fixed electrode provided in the substrate. The movable unit serves as a vibrator. The movable unit is supported via the supporting beam, and is displaceable in a detecting direction. The comb-shaped fixed electrode includes a plurality of fixed electrode portions arranged in the detecting direction at predetermined intervals. The comb-shaped movable electrode includes a plurality of movable electrode portions. The movable electrode is engaged with the fixed electrode such that each of the movable electrode portions is located between adjacent two of the fixed electrode portions.

The angular velocity sensor detects an angular velocity by detecting a change in capacitance of a capacitor provided by the fixed electrode portions and the movable electrode portions when the movable unit is displaced in the detecting direction due to Coriolis force along the detecting direction.

Japanese Patent No. 3,512,004 (hereinafter referred to as the patent document 2) describes an angular velocity sensor that includes a substrate, a vibrator, a servo electrode, and a servo control circuit. The vibrator is coupled with the substrate through a beam and a frame. The vibrator is displaceable in a vibrating direction and a detecting direction. The vibrating direction and the detecting direction are parallel to a surface of the substrate and perpendicular to each other. The servo electrode and the servo control circuit restrict vibration of the vibrator in the detecting direction. The angular velocity sensor calculates a servo voltage for restricting the vibration of the vibrator in the detecting direction, and calculates an angular velocity based on the servo voltage.

Each of the above-described angular velocity sensors is manufactured by processing a silicon-on-insulator (SOI) substrate by a known micromachining technique. In such processing, machining error occurs in some measure. If machining error occurs, the vibration in the vibrating direction may escape in the detecting direction. Further, in a case where the vibrator is vibrated under atmospheric pressure or under pressure approximate to the atmospheric pressure, the vibration in the vibrating direction may escape in the detecting direction due to viscosity of gas molecules. As a result, the vibrator vibrates in the detecting direction due to the Coriolis force, an escaping component caused by the machining error, and an escaping component caused by the viscosity of gas molecules.

The angular velocity sensor described in the patent document 1 does not have a configuration for restricting influence of the error-caused escaping component and the viscosity-caused escaping component. Thus, detection accuracy of the angular velocity may be reduced by the escaping components.

In the angular velocity sensor described in the patent document 2, the servo electrode and the servo control circuit restrict vibration of the vibrator in the detecting direction. Thus, influence of the error-caused escaping component and the viscosity-caused escaping component may be reduced.

As described above, however, the vibrator vibrates in the detecting direction due to the Coriolis force, the error-caused escaping component and the viscosity-caused escaping component. Therefore, if the escaping components increase, a servo load applied to the servo electrode and the servo control circuit may increase.

SUMMARY OF THE INVENTION

Because the error-caused escaping component is determined by the machining error, it is difficult to reduce the value of the error-caused escaping component by adjusting resonance frequency and structural dimensions. On the other hand, the viscosity-caused escaping component depends on the resonance frequency.

The present invention is made in view of the foregoing matter, and it is an object of the present invention to provide an angular velocity sensor with a reduced servo load by vibrating a vibrator at a resonance frequency that is capable of reducing the viscosity-caused escaping component.

It may be possible to vacuum-package an angular velocity sensor so that the angular velocity sensor operates under a vacuum condition, in order to eliminate the viscosity-caused escaping component. To implement such a vacuum package, a structure is complex, and thus manufacturing process increases.

An angular velocity sensor according to a first aspect of the present invention includes a substrate, a vibrator, a beam part, a driving part, a detecting part, and a restricting part. The beam part couples the vibrator with the substrate such that the vibrator is displaceable in a first direction and a second direction that is perpendicular to the first direction. The driving part is configured to vibrate the vibrator in the first direction. The detecting part is configured to detect displacement of the vibrator in the second direction as a change in capacitance, the displacement of the vibrator in the second direction being caused by Coriolis force generated in the vibrator due to vibration of the vibrator and an angular velocity around a third direction that is perpendicular to the first direction and the second direction. The restricting part is configured to restrict displacement of the vibrator in the second direction based on the change in capacitance.

Further, the angular velocity sensor is configured such that a detuning degree $\alpha$ and a Q-value $Q_s$ in the second direction satisfy one of a first relation that is defined by one of the following expression 1 and expression 2 where the Q-value $Q_s$ is equal to or less than 3, and a second relation defined by one of the following expression 3 and expression 4 where the Q-value $Q_s$ is equal to or higher than 3. The detuning degree $\alpha$ is defined by $f_s/f_d$ in which $f_s$ is resonance frequency in the second direction and $f_d$ is resonance frequency in the first direction. The Q-value $Q_s$ is defined by $(mk_s)^{0.5}/c_s$, in which m is a mass of the vibrator, $k_s$ is a spring constant of the beam part in the second direction, and $c_s$ is an attenuation constant of the vibrator in the second direction.

$$\alpha \geq -0.0992 Q_s^2 + 0.4874 Q_s + 0.6592 \qquad \text{<Expression 1>}$$

$$\alpha \leq 0.0916 Q_s^2 - 0.4795 Q_s + 1.4794 \qquad \text{<Expression 2>}$$

$$\alpha \geq 1.2878 Q_s^{-0.0488} \qquad \text{<Expression 3>}$$

$$\alpha \leq 0.8233 Q_s^{0.0344} \qquad \text{<Expression 4>}$$

When an angular velocity is applied to the vibrator in a direction around the third direction that is perpendicular to the first direction and the second direction in a state where the vibrator vibrates in the first direction, the vibrator vibrates in the second direction due to the Coriolis force, the error-caused escaping component and the viscosity-caused escaping component. The viscosity-caused escaping component has a property of being proportional to $\beta \sin \theta$, which is defined by the following expression 5:

$$\beta \sin\theta = \frac{1}{\sqrt{\{1-(f_d/f_s)^2\}^2 + \{f_d/(f_s \cdot Q_s)\}^2}} \qquad \text{< Expression 5 >}$$

$$\sin\left[\tan^{-1}\left\{\frac{1/Q_s \cdot (f_d/f_s)}{1-(f_d/f_s)^2}\right\}\right]$$

According to the expression 5, $\beta \sin \theta$ is determined by the resonance frequencies $f_d$, $f_s$ (the detuning degree $\alpha$) and the Q-value $Q_s$ in the second direction. The Q-value $Q_s$ almost depends on the structure of the angular velocity sensor. Therefore, a condition where $\beta \sin \theta$ is equal to or less than 1% was analyzed by controlling the detuning degree $\alpha$.

The above configuration was found based on the result of analysis, and $\beta \sin \theta$ is equal to or less than 1% when the first or second relation defined by one of the above expressions 1 through 4 is satisfied. In such a configuration, therefore, the viscosity-caused escaping component is reduced even if the angular velocity sensor is operated under atmospheric pressure or pressure approximate to the atmospheric pressure, and the load to the restricting part is reduced. Also, since the viscosity-caused escaping component, which results in noise, is reduced, detection accuracy of the angular velocity sensor improves.

In an angular velocity sensor according to a second aspect of the present invention, the vibrator is one of a pair of vibrators, and each of the vibrators includes a driving frame having a frame shape and a detecting frame having a frame shape and surrounded by the driving frame.

In an angular velocity sensor according to a third aspect of the present invention, the beam part includes a driving beam coupling the driving frame with the substrate, a detecting beam coupling the driving frame with the detecting frame, and a coupling beam coupling the driving frame of one of the pair of the vibrators and the driving frame of the other of the pair of the vibrators. The driving part includes a first driving electrode and a second driving electrode. The first driving electrode is provided on an outer portion of the driving frame, and the second driving electrode is provided on the substrate at a portion outside of the driving frame. The detecting part includes a first detecting electrode and a second detecting electrode. The restricting part includes a first restricting electrode and a second restricting electrode. The first detecting electrode and the first restricting electrode are provided on an inner portion of the detecting frame. The second detecting electrode and the second restricting electrode are provided on the substrate at portions surrounded by the detecting frame.

In such a configuration, the first detecting electrode and the first restricting electrode are provided on the detecting frame, and the detecting frame is coupled with the driving frame through the detecting beam. Therefore, the configuration restricts a part of an external force applied to a base portion from being transmitted to the detecting frame. As such, it is less likely that capacitances of the detecting electrode and the restricting electrode will be affected by the external force.

An angular velocity sensor according to a fourth aspect of the present invention further includes a monitoring part configured to monitor a vibrating state of the driving frame. The monitoring part includes a first monitoring electrode and a second monitoring electrode. The first monitoring electrode is provided on the driving frame of each of the pair of vibrators, and the second monitoring electrode is opposed to the first monitoring electrode in the second direction. In such a configuration, variation in vibration amplitude due to a change in temperature can be monitored.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EXEMPLARY EMBODIMENT

An angular velocity sensor 100 according to an embodiment of the present invention will be described with reference to the drawings.

Figure 1:
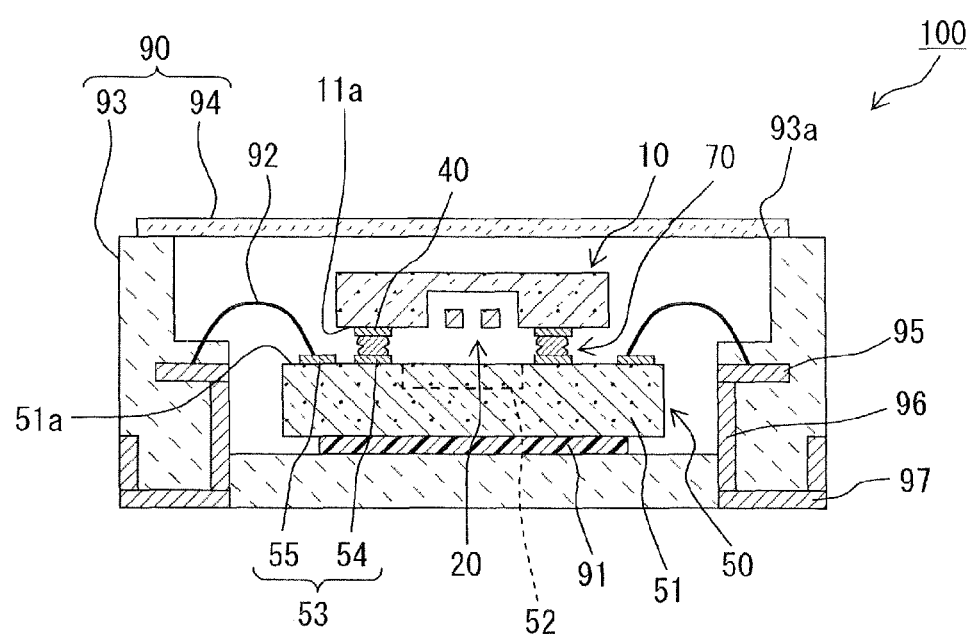
FIG. 1 is a cross-sectional view of an angular velocity sensor according to an embodiment of the present invention.

Referring to FIG. 1, the angular velocity sensor 100 includes a sensor chip 10, a circuit chip 50, multiple bumps 70, and a package 90. The sensor chip 10 and the circuit chip 50 are mechanically and electrically coupled with each other through the bumps 70. The circuit chip 50 and the package 90 are mechanically coupled with each other through an adhesive 91. The circuit chip 50 and the package 90 are electrically coupled with each other through wires 92. The sensor chip 10 and the circuit chip 50 are housed in a space defined by the package 90. The sensor chip 10 is placed under atmospheric pressure or pressure approximate to the atmospheric pressure.

The sensor chip 10 includes a semiconductor substrate 11 having a front surface 11a. In the following description, a direction along the front surface 11a is referred to as an X-axis direction, a direction along the front surface 11a and perpendicular to the X-axis direction is referred to as a Y-axis direction, and a direction perpendicular to the X-axis direction and the Y-axis direction is referred to as a Z-axis direction. The X-axis direction corresponds to a first direction, the Y-axis direction corresponds to a second direction, and the Z-axis direction corresponds to a third direction. The X-axis direction corresponds to a direction along a vibration axis, and thus can be referred to as a vibrating direction. The Y-axis direction corresponds to a direction along a detecting axis, and thus can be referred to as a detecting direction. Also, the third direction can be referred to as a detected-axis direction.

Figure 2:
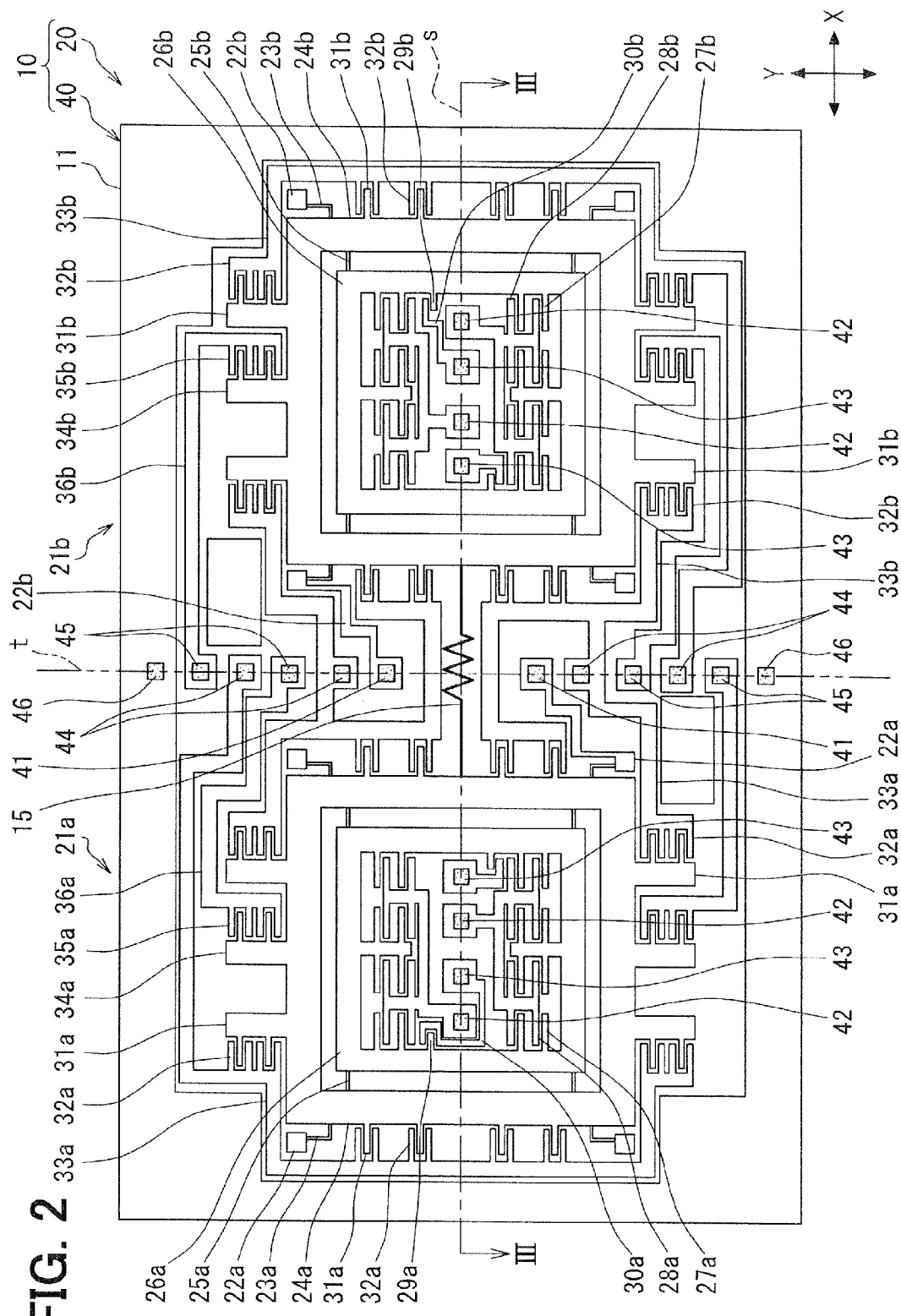
FIG. 2 is a plan view of a sensor chip of the angular velocity sensor according to the embodiment.

Referring to FIG. 2, a first virtual straight line s shown by an alternate long and short dashed-line and extending along the X-axis direction bisects the sensor chip 10 in the Y-axis direction. A second virtual straight line t shown by a chain double dashed-line and extending along the Y-axis direction bisects the sensor chip 10 in the X-axis direction.

Figure 3:
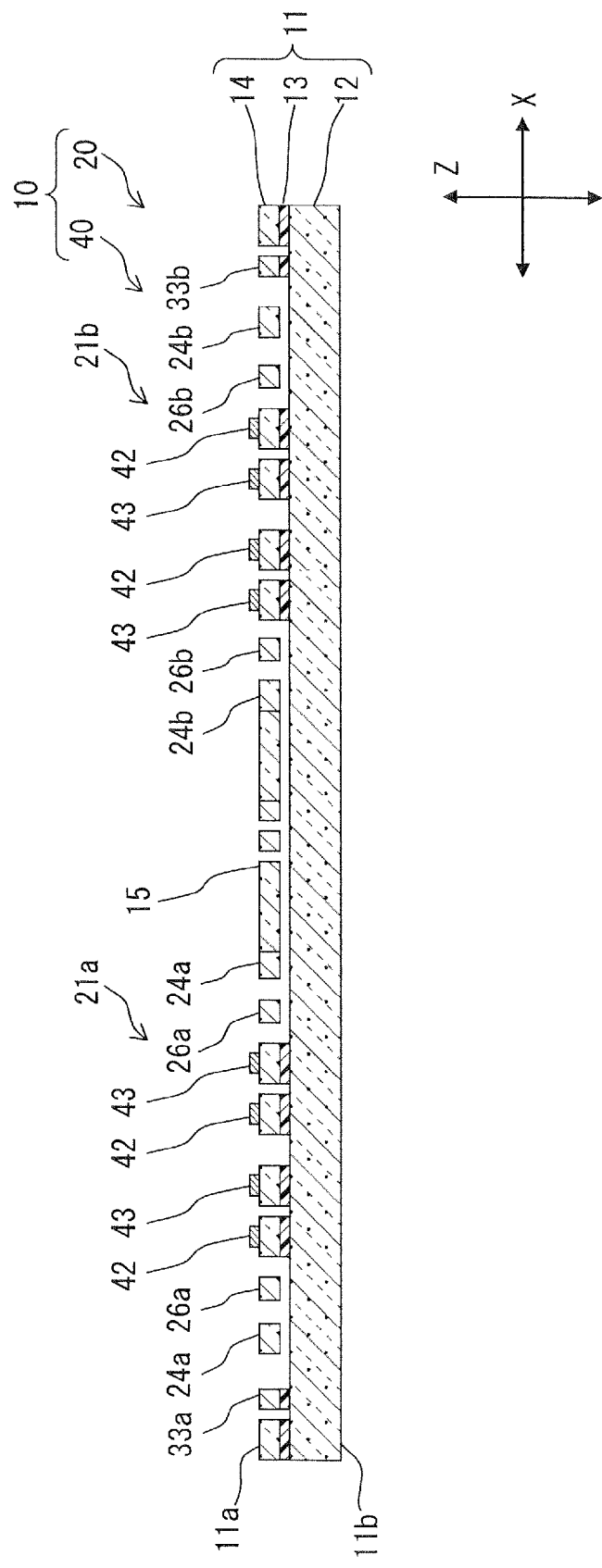
FIG. 3 is a cross-sectional view of the sensor chip taken along a line III-III in FIG. 2.

As shown in FIG. 2 and FIG. 3, the sensor chip 10 includes the semiconductor substrate 11, a sensor part 20 formed at a portion of the semiconductor substrate 11 adjacent to the front surface 11a, and multiple sensor pads 40 electrically coupled with the sensor part 20. The semiconductor substrate 11 is a silicon-on-insulator (SOI) substrate in which a first semiconductor layer 12, an insulating layer 13, and a second semiconductor layer 14 are stacked in this order.

The sensor part 20 is formed at the portion of the semiconductor substrate 11 adjacent to the front surface 11a, that is, a portion of the semiconductor substrate 11 adjacent to the second semiconductor layer 14 by a known exposure technique. The sensor pads 40 are formed on predetermined portions of the second semiconductor layer 14.

The sensor part 20 is mainly provided by the second semiconductor layer 14. The sensor part 20 includes a fixed portion that is fixed to the first semiconductor layer 12 through the insulating layer 13 and a floating portion that floats above the first semiconductor layer 12 without through the insulating layer 13. The fixed portion is not movable relative to the first semiconductor layer 12, and the floating portion is displaceable, that is, movable in the X-axis direction and the Y-axis direction relative to the first semiconductor layer 12.

The sensor part 20 detects an angular velocity. As shown in FIG. 2 and FIG. 3, the sensor part 20 includes a pair of detecting sections 21a, 21b. In FIG. 2, the detecting section 21a corresponds to a left section of the sensor part 20 divided by the second virtual straight line t, and the detecting section 21b corresponds to a right section of the sensor part 20 divided by the second virtual straight line t.

A configuration of the detecting section 21a will be described hereinafter. Because the detecting section 21a and the detecting section 21b have similar configurations, the configuration of the detecting section 21b will be described only about a correspondence relationship between the detecting section 21a and the detecting section 21b.

The detecting section 21a includes an anchor 22a, a first driving beam 23a, a driving frame 24a, a detecting beam 25a, a detecting frame 26a, a first detecting electrode 27a, a second detecting electrode 28a, a first servo electrode 29a, and a second servo electrode 30a, as main components for detecting angular velocity. The driving frame 24a is coupled with the anchor 22a through the first driving beam 23a. The detecting frame 26a is coupled with the driving frame 24a through the detecting beam 25a. The first detecting electrode 27a is disposed on the detecting frame 26a. The second detecting electrode 28a is opposed to the first detecting electrode 27a. The first servo electrode 29a is disposed on the detecting frame 26a. The second servo electrode 30a is opposed to the first servo electrode 29a.

The detecting section 21a includes a first driving electrode 31a, a second driving electrode 32a, and a second driving beam 33a as main components for driving the driving frame 24a. The first driving electrode 31a is disposed on the driving frame 24a. The second driving electrode 32a is disposed on the second driving beam 33a and is opposed to the first driving electrode 31a.

The detecting section 21a includes a first monitoring electrode 34a, a second monitoring electrode 35a, and a monitoring beam 36a as components for monitoring a driving state of the driving frame 24a, such as a vibrating state of the driving frame 24a. The first monitoring electrode 34a is disposed on the driving frame 24a. The second monitoring electrode 35a is disposed on the monitoring beam 36a and is opposed to the first monitoring electrode 34a.

The aforementioned components 22a through 36a of the detecting section 21a can be formed by etching the second semiconductor layer 14 and the insulating layer 13 with a mask pattern. In the components 22a through 36a, the anchor 22a, the second detecting electrode 28a, the second servo electrode 30a, the second driving electrode 32a, the second driving beam 33a, the second monitoring electrode 35a, and the monitoring beam 36a are fixed to the first semiconductor layer 12 through the insulating layer 13. Thus, the anchor 22a, the second detecting electrode 28a, the second servo electrode 30a, the second driving electrode 32a, the second driving beam 33a, the second monitoring electrode 35a, and the monitoring beam 36a are not movable relative to the first semiconductor layer 12.

In the components 22a through 36a, the first driving beam 23a, the driving frame 24a, the detecting beam 25a, the detecting frame 26a, the first detecting electrode 27a, the first servo electrode 29a, the first driving electrode 31a, and the first monitoring electrode 34a are floating with respect to the first semiconductor layer 12 because the insulating layer 13 located under the second semiconductor layer 14 is removed by sacrifice layer etching. Thus, the first driving beam 23a, the driving frame 24a, the detecting beam 25a, the detecting frame 26a, the first detecting electrode 27a, the first servo electrode 29a, the first driving electrode 31a, and the first monitoring electrode 34a are displaceable, such as, can be vibrated in the X-axis direction and the Y-axis direction relative to the first semiconductor layer 12.

The anchor 22a holds the driving frame 24a through the first driving beam 23a. As shown in FIG. 2, a first sensor pad 41 is disposed on the anchor 22a located at a center portion of the sensor part 20. The first sensor pad 41 is applied with a direct-current (DC) voltage. The DC voltage is input to the driving frame 24a through the first driving beam 23a. The DC voltage is also input to the detecting frame 26a through the first driving beam 23a, the driving frame 24a, and the detecting beam 25a. Thus, the driving frame 24a and the detecting frame 26b are equipotential with the DC voltage.

The driving frame 24a vibrates in the X-axis direction by a driving force, which will be described later. The driving frame 24a has a frame shape, such as, a rectangular loop shape, including an outer portion and an inner portion. The first driving electrode 31a and the first monitoring electrode 34a protrude outward from the outer portion of the driving frame 24a, and the first driving beam 23a is coupled with the outer portion of the driving frame 24a. Since the driving frame 24a is equipotential with the DC voltage as described above, the first driving electrode 31a and the first monitoring electrode 34a, which are provided on the driving frame 24a, are equipotential with the DC voltage. The detecting beam 25a is coupled with the inner portion of the driving frame 24a. The driving frame 24a and the detecting frame 26a are coupled with each other through the detecting beam 25a. Thus, the detecting frame 26a can vibrate in the X-axis direction with vibration of the driving frame 24a in the X-axis direction.

The detecting frame 26a is disposed in a region surrounded by the driving frame 24a and is coupled with the driving frame 24a through the detecting beam 25a. Thus, the detecting frame 26a vibrates in the X-axis direction with vibration of the driving frame 24a in the X-axis direction. The detecting frame 26a has a frame shape, such as a rectangular loop shape, including an outer portion and an inner portion. The detecting beam 25a is coupled with the outer portion of the detecting frame 26a. The first detecting electrode 27a and the first servo electrode 29a protrude inward from the inner portion of the detecting frame 24a. Since the detecting frame 26a is equipotential with the DC voltage as described above, the first detecting electrode 27a and the first servo electrode 29a, which are provided on the detecting frame 26a, are equipotential with the DC voltage.

The second detecting electrode 28a is disposed in a region surrounded by the inner portion of the detecting frame 26a. The second detecting electrode 28a is opposed to the first detecting electrode 27a in the Y-axis direction. A second sensor pad 42 is disposed on the second detecting electrode 28a. The second sensor pad 42 outputs a change in capacitance of a first capacitor $C_1$ provided by the first detecting electrode 27a and the second detecting electrode 28a.

The second servo electrode 30a is disposed in a region surrounded by the inner portion of the detecting frame 26a. The second servo electrode 30a is opposed to the first servo electrode 29a in the Y-axis direction. A third sensor pad 43 is disposed on the second servo electrode 30a. The third sensor pad 43 is applied with a servo voltage that is determined based on an output signal from the second sensor pad 42. As described above, the first servo electrode 29a is equipotential with the DC voltage. Thus, an electrostatic force (servo force) being proportional to a voltage depending on the DC voltage and the servo voltage is generated in a second capacitor $C_2$ that is provided by the first servo electrode 29a and the second servo electrode 30a. The servo force is applied in the Y-axis direction so as to restrict displacement, such as, vibration of the detecting frame 26a in the Y-axis direction. In the present embodiment, the servo voltage is detected as a physical quantity for determining an angular velocity.

The first driving electrode 31a and the second driving electrode 32a are provided for vibrating the driving frame 24a. A fourth sensor pad 44 is disposed on the second driving beam 33a on which the second driving electrode 32a is provided. The fourth sensor pad 44 is applied with a driving voltage that has polarity changed with a predetermined period. As described above, the first driving electrode 31a is equipotential with the DC voltage. Thus, an electrostatic force (driving force) being proportional to a voltage depending on the DC voltage and the driving voltage is generated in a third capacitor $C_3$ that is provided by the first driving electrode 31a and the second driving electrode 32a. By the driving force along the X-axis direction, the driving frame 24a on which the first driving electrode 31a is provided is displaced in the X-axis direction. Because the polarity of the driving voltage is changed with the predetermined period, a direction of the driving force acting on the first driving electrode 31a is changed in the X-axis direction in the predetermined period. Thus, the driving frame 24a on which the first driving electrode 31a is provided vibrates in the X-axis direction with the predetermined period.

The first monitoring electrode 34a and the second monitoring electrode 35a are provided for monitoring the driving state, such as the vibrating state of the driving frame 24a. A fifth sensor pad 34 is disposed on the monitoring beam 36a on which the second monitoring electrode 35a is provided. The fifth sensor pad 45 outputs a change in capacitance of a fourth capacitor $C_4$ provided by the first monitoring electrode 34a and the second monitoring electrode 35a. Since the first monitoring electrode 34a is equipotential with the DC voltage as described above, the second monitoring electrode 35a is expected to generate a voltage depending on the DC voltage. In the present embodiment, the vibrating state of the driving frame 24a is monitored by monitoring the output signal of the second monitoring electrode 35a.

Next, the correspondence relationship between the detecting section 21a and the detecting section 21b will be described. The detecting section 21b includes an anchor 22b, a first driving beam 23b, a driving frame 24b, a detecting beam 25b, a detecting frame 26b, a first detecting electrode 27b, a second detecting electrode 28b, a first servo electrode 29b, a second servo electrode 30b, a first driving electrode 31b, a second driving electrode 32b, a second driving beam 33b, a first monitoring electrode 34a, a second monitoring electrode 35b, and a monitoring beam 36b. The anchor 22b corresponds to the anchor 22a. The first driving beam 23b corresponds to the first driving beam 23a. The driving frame 24b corresponds to the driving frame 24a. The detecting beam 25b corresponds to the detecting beam 25a. The detecting frame 26b corresponds to the detecting frame 26a. The first detecting electrode 27b corresponds to the first detecting electrode 27a. The second detecting electrode 28b corresponds to the second detecting electrode 28a. The first servo electrode 29b corresponds to the first servo electrode 29a. The second servo electrode 30b corresponds to the second servo electrode 30a. The first driving electrode 31b corresponds to the first driving electrode 31a. The second driving electrode 32b corresponds to the second driving electrode 32a. The second driving beam 33b corresponds to the second driving beam 33a. The first monitoring electrode 34b corresponds to the first monitoring electrode 34a. The second monitoring electrode 35b corresponds to the second monitoring electrode 35a. The monitoring beam 36b corresponds to the monitoring beam 36a.

As shown in FIG. 2, the second driving beam 33a located in the center portion of the sensor part 20 and the second driving beam 33b disposed in the center portion of the sensor part 20 are integral. The first sensor pad 42 is disposed on the anchor 22b located in the center portion of the sensor part 20. The second sensor pad 42 is disposed on the second detecting electrode 28b. The third sensor pad 43 is disposed on the first servo electrode 29b. The fourth sensor pad 44 is disposed on the second driving beam 33b. Further, the fifth sensor pad 45 is disposed on the monitoring beam 36b.

The sensor pads 40 include sensor pads 41 through 46 for mechanically and electrically coupling the sensor chip 10 and the circuit chip 50. The first sensor pad 41 is disposed on each of the anchors 22a, 22b. The second sensor pad 42 is disposed on each of the second detecting electrodes 28a, 28b. The third sensor pad 43 is disposed on each of the second servo electrodes 30a, 30b. The fourth sensor pad 44 is disposed on each of the second driving beams 33a, 33b. The fifth sensor pad 45 is disposed on each of the monitoring beams 36a, 36b. Further, sixth sensor pads 46 are disposed on portions of the second semiconductor layer 14 that are not etched with the mask pattern.

As described above, the DC voltage is input to the first sensor pad 41, the capacitance of the first capacitor $C_1$ is output from the second sensor pad 42, and the servo voltage is input to the third sensor pad 43. The driving voltage is input to the fourth sensor pad 44, and the capacitance of the fourth capacitor $C_4$ is output from the fifth sensor pad 45. A constant voltage is input to each of the sixth sensor pads 46 so that the sensor chip 10 has a constant potential.

Next, driving of the detecting section 21a and the detecting section 21b will be described. As shown in FIG. 2 and FIG. 3, the driving frame 24a is coupled with the anchor 22a through the first driving beam 23a, and the driving frame 24b is coupled with the anchor 22b through the first driving beam 23b. Further, the driving frame 24a is coupled with the driving frame 24b through a coupling beam 15. Thus, the driving force generated between the first driving electrodes 31a and the second driving electrode 32a and the driving force generated in the first driving electrode 31b and the second driving electrode 32b enable coupled-vibration of the driving frame 24a and the driving frame 24b in the X-axis direction.

In order to vibrate the driving frame 24a and the driving frame 24b in opposite phase with respect to the X-axis direction, driving voltages of inversion polarities are applied to the fourth sensor pads 44 that are shared by the second driving beams 33a, 33b located at the center portion and the fourth sensor pads 44 that are respectively disposed on the second driving beams 33a, 33b located in a right portion or a left portion of the sensor part 20. Accordingly, the driving force acting on the driving frame 24a and the driving force acting on the driving frame 24b act in opposite directions to each other in the X-axis direction, and thus the driving frame 24a and the driving frame 24b coupled-vibrate in the opposite phases in the X-axis direction.

As described above, the detecting frame 26a is coupled with the driving frame 24a through the detecting beam 25a. The detecting frame 26b is coupled with the driving frame 24b through the detecting beam 25b. Thus, when the driving frame 24a and the driving frame 24b vibrate in the opposite phases in the X-axis direction, the detecting frame 26a and the detecting frame 26b also vibrate in the opposite phases in the X-axis direction.

When the angular velocity sensor 100 is applied with an angular velocity in a direction along the Z-axis in a state where the detecting frame 26a and the detecting frame 26b vibrate in the opposite phases in the X-axis direction, Coriolis force in the Y-axis direction is generated at each of the detecting frames 26a, 26b. When each of the detecting frames 26a, 26b is displaced in the Y-axis direction by the Coriolis force, the first detecting electrode 27a provided on the detecting frame 26a and the first detecting electrode 27b provided on the detecting frame 26b are also displaced in the Y-axis direction. Accordingly, the distance between the first detecting electrode 27a and the second detecting electrode 28a and the distance between the first detecting electrode 27b and the second detecting electrode 28b change, and thus the capacitances of the first capacitors $C_1$ change. The changes in capacitance are input to the circuit chip 50 through the second sensor pads 42 disposed on the second detecting electrodes 28a, 28b, the bumps 70, and circuit pads 54 disposed on the circuit chip 50.

The circuit chip 50 calculates the servo voltage to restrict displacement (vibration) of the detecting frames 26a, 26b in the Y-axis direction based on the changes in capacitances. The calculated servo voltage is input to each of the second servo electrodes 30a, 30b through the circuit pads 54, the bumps 70, and the third sensor pads 43. Accordingly, the servo forces to restrict displacement of the detecting frames 26a, 26b in the Y-axis direction are generated at the second capacitor $C_2$ provided by the first servo electrode 29a and the second servo electrode 30a and the second capacitor $C_2$ provided by the first servo electrode 29b and the second servo electrode 30b. As a result, the detecting frames 26a, 26b are restricted from displacing in the Y-axis direction.

An acting direction of Coriolis force depends on a vibrating direction. Since the detecting frame 26a and the detecting frame 26b coupled-vibrate in the opposite phases in the X-axis direction, Coriolis force acting on the detecting frame 26a and Coriolis force acting on the detecting frame 26b act in the opposite directions. Thus, increase and decrease of the capacitance of the third capacitor $C_3$ provided by the first detecting electrode 27a and the second detecting electrode 28a is opposite to increase and decrease of the capacitance of the third capacitor $C_3$ provided by the first detecting electrode 27b and the second detecting electrode 28b. In other words, when the capacitance of one of the third capacitors $C_3$ increases, the capacitance of the other of the third capacitors $C_3$ decreases. By calculating the difference between the capacitances of the two third capacitors $C_3$, a capacitance depending on the angular velocity can be detected. The calculation of the difference is performed by the circuit chip 50.

The circuit chip 50 includes a semiconductor substrate 51 having a surface 51a, a circuit part 52 formed in the surface 51a, and the pads 53. The circuit part 52 processes the output signals of the sensor chip 10, and the pads 53 are electrically coupled with the circuit part 52. The pads 53 include the circuit pads 54 corresponding to the sensor pads 40 and outer pads 55 electrically coupled with the wires 92. The circuit part 52 also inputs control signals to the sensor chip 10. The control signals include the DC voltages, the driving voltages, the servo voltages, and the constant voltages.

The package 90 includes a housing 93 and a lid 94. The housing 93 has an opening portion 93a. The lid 94 covers the opening portion 93a. The adhesive 91 is disposed on a bottom inner surface of the housing 93. The housing 93 and the circuit chip 50 are mechanically coupled through the adhesive 91. The housing 93 includes inner terminals 95, inner wires 96, and outer terminals 97. The inner terminals 95 are disposed in inner surface of sidewalls of the housing 93. The inner wires 96 are disposed on the inner surface the sidewalls of the housing 93. The outer terminals 97 are disposed on an outer surface of the bottom of the housing 93. The inner terminals 95 and the outer pads 55 of the circuit chip 50 are electrically coupled through the wires 92. Thus, electrical signals of the circuit chip 50 can be output to an external device through the outer pads 55, the wires 92, the inner terminals 95, the inner wires 96, and the outer terminals 97. The housing 93 and the lid 94 are mechanically and electrically coupled with each other.

As described above, the detecting frames 26a, 26b respectively vibrate in the X-axis direction by the driving forces. In such a driving and vibrating mode, the detecting frames 26a, 26b are resonated at resonance frequency $f_d$ (hereinafter, referred to as driving resonance frequency) in the X-axis direction. When an angular velocity in a direction around the Z axis acts on each of the detecting frames 26a, 26b in such a vibrating state, each of the detecting frames 26a, 26b vibrates in the Y-axis direction. In the present embodiment, resonance frequency (hereinafter, referred to as the detecting resonance frequency) $f_s$ in the Y-axis direction of each of the detecting frames 26a, 26b is different from the driving resonance frequency $f_d$.

For example, the driving resonance frequency $f_d$ is 10 kHz, and the detecting resonance frequency $f_s$ is 12 kHz. Thus, a detuning degree a defined by dividing the detecting resonance frequency $f_s$ by the driving resonance frequency $f_d$ is 1.2 (i.e., $\alpha=f_s/f_d=1.2$). Assuming that a mass of the detecting frame 26a, 26b is m, a spring constant of the detecting beam 25a, 25b in the Y-axis direction is $k_s$, and an attenuation constant of the detecting frame 26a, 26b in the Y-axis direction is $c_s$, Q-value $Q_s$ in the Y-axis direction is defined by $(mk_s)^{0.5}/c_s$. In the present embodiment, $Q_s$ is adjusted to 5 (i.e., $Q_s=5$).

As described above, the sensor chip 10 is placed under the atmospheric pressure or the pressure approximate to the atmospheric pressure. Thus, when the detecting frames 26a, 26b vibrate in the X-axis direction, a vibration component in the X-axis direction escapes to a vibration component in the Y-axis direction due to viscosity of gas molecules. The escaping component due to the viscosity (hereinafter, referred to as viscosity-caused escaping component) is proportional to the expression 5:

$$\beta\sin\theta = \frac{1}{\sqrt{\{1-(f_d/f_s)^2\}^2 + \{f_d/(f_s \cdot Q_s)\}^2}}$$
$$\sin\left[\tan^{-1}\left\{\frac{1/Q_s \cdot (f_d/f_s)}{1-(f_d/f_s)^2}\right\}\right]$$
<Expression 5>

As the viscosity-caused escaping component increases, the servo voltages applied to the second servo electrodes 30a, 30b increase. As a result, the servo loads applied to the servo electrodes 29, 30 and the circuit part 52 increase. Also, because the viscosity-caused escaping component results in noise, if the escaping component increases, detection accuracy of the angular velocity degrades.

Figure 4:
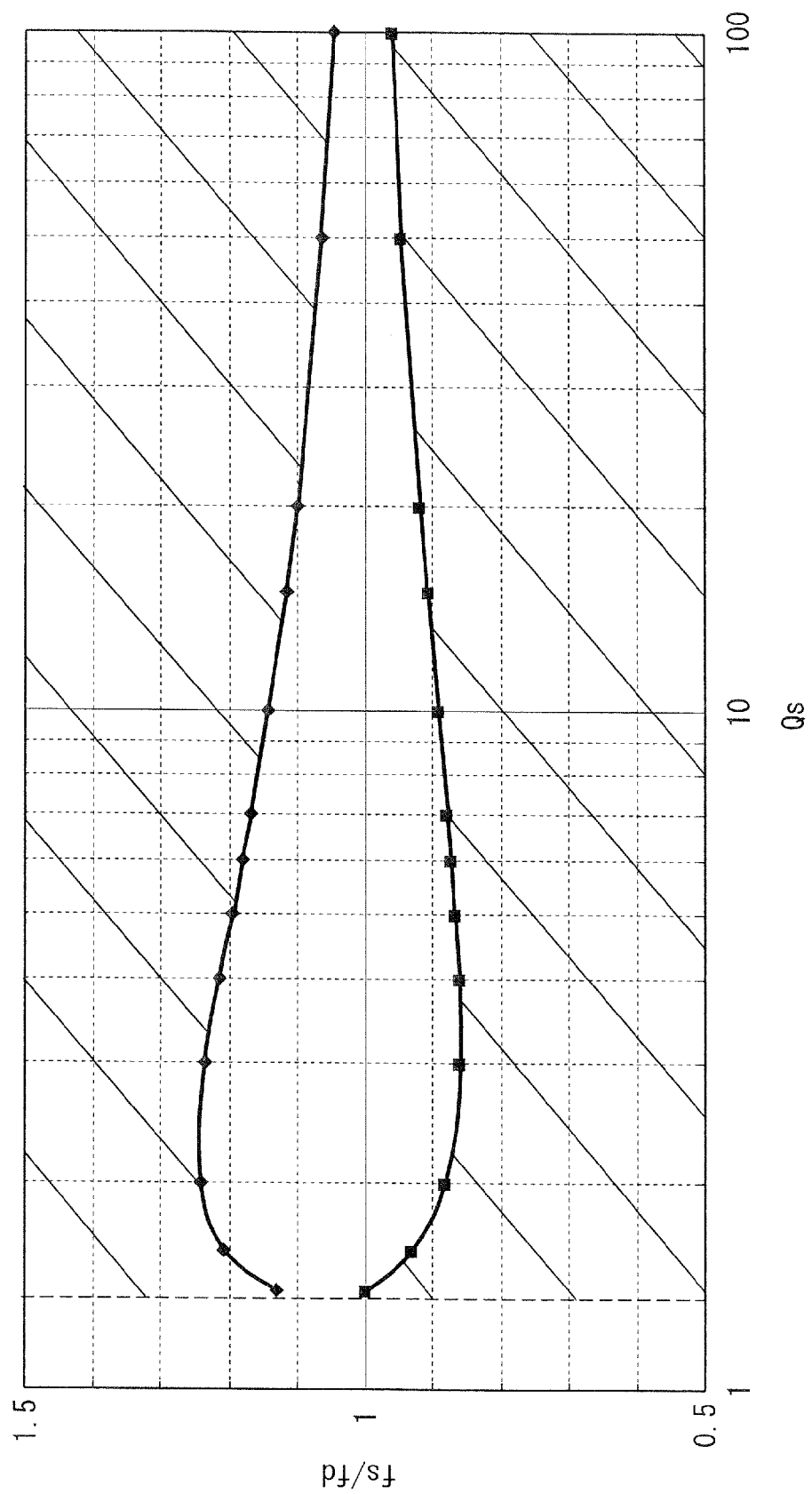
FIG. 4 is a graph showing a detuning degree according to the embodiment.

As represented by the expression 5, the viscosity escaping component is proportional to β sin θ, which is determined by the resonance frequencies $f_d$, $f_s$, and the Q-value $Q_s$ in the detecting direction, that is, in the Y-axis direction. The Q-value $Q_s$ almost depends the structure of the sensor part 20. Thus, a condition where β sin θ is equal to or less than 1% (i.e., β sin θ≤1%) was analyzed by controlling the detuning degree α. FIG. 4 shows an analysis result.

In FIG. 4, multiple detuning degrees α and multiple Q-values Qs where β sin θ is 1% are calculated and plotted, and then calculated by a least squares method. The condition where β sin θ is equal to or less than 1% corresponds to a hatched region in FIG. 4. The region, where the Q-value $Q_s$ is equal to or less than 3, satisfies a relation defined by the following expressions 6 and 7:

$$\alpha \geq -0.0992 Q_s^2 + 0.4874 Q_s + 0.6592$$ <Expression 6>

$$\alpha \leq 0.0916 Q_s^2 - 0.4795 Q_s + 1.4794$$ <Expression 7>

The region, where the Q-value $Q_s$ is equal to or greater than 3, satisfies a relation defined by the following expressions 8 and 9:

$$\alpha \geq 1.2878 Q_s^{-0.0488}$$ <Expression 8>

$$\alpha \leq 0.8233 Q_s^{0.0344}$$ <Expression 9>

As described above, the angular velocity sensor 100 is configured such that the detuning degree α is 1.2 and the Q-value $Q_s$ in the Y-axis direction is 5, for example. It is confirmed that such a condition is located in the hatched region in FIG. 4, and thus satisfies the relation defined by the expression 8. As such, the angular velocity sensor 100 satisfies the condition of β sin θ≤1. Therefore, the viscosity-caused escaping component is reduced, and the servo load, such as, a load to a restricting part is reduced. In addition, since the viscosity-caused escaping component, which results in noise, is reduced, the detection accuracy improves.

The exemplary embodiment of the present invention is described hereinabove. However, the present invention is not limited to the above described exemplary embodiment, but may be implemented in various other ways without departing from the spirit of the invention.

In the above exemplary embodiment, the Q-value $Q_s$ is 5 and the detuning degree α is 1.2, as an example. The combination of the Q-value $Q_s$ and the detuning degree α is not limited to the above as long as satisfying the expressions 6 through 9. For example, the combination can be adjusted such that the detuning degree α is 1.25 and the Q-value $Q_s$ is 3. As another example, the combination can be adjusted such that the detuning degree α is 1.15 and the Q-value $Q_s$ is 10.

In the above exemplary embodiment, the Coriolis force is calculated based on the servo voltage, and thus the calculated Coriolis force does not depend on the above β and θ. In a case where the Coriolis force is calculated based on the capacitance change of the first capacitor $C_1$, which is provided by the detecting electrodes 27a, 28a, 27, 28b, since the capacitance change depends on β and θ, if the resonance frequencies $f_d$, $f_s$ are controlled such that the β sin θ is equal to or less than 1, a detecting sensitivity of the Coriolis force is remarkably reduced. Therefore, the aforementioned relation between the resonance frequencies $f_d$, $f_s$ and the Q-value $Q_s$ in the Y-axis direction is preferable in the configuration in which Coriolis force is detected based on the servo voltage.

The aforementioned β sin θ is obtained by solving the following expressions 10 and 11:

$$m\ddot{x} + c_d\dot{x} + k_d x = F_d(t)$$ <Expression 10>

$$m\ddot{y} + c_s\dot{y} + k_s y = F_c(t)$$ <Expression 11>

The expression 10 represents an equation of motion of the detecting frame 26a, 26b in the X-axis direction, and the expression 11 represents an equation of motion of the detecting frame 26a, 26b in the Y-axis direction. In the expression 10, x is a displacement of the detecting frame 26a, 26b in the X-axis direction. In the expression 11, y is a displacement of the detecting frame 26a, 26b in the Y-axis direction. Also, $c_d$ is an attenuation constant in the X-axis direction, and $k_d$ is a spring constant in the X-axis direction. $F_d(t)$ corresponds to the aforementioned driving force and $F_s(t)$ corresponds to the aforementioned Coriolis force.

According to the expressions 10 and 11, y, which represents the displacement (vibration) of the detecting frame 26a, 26b in the Y-axis direction satisfies a proportional relation defined by the following expression 12:

$$y \propto \beta \cos\theta + \beta \sin\theta$$ <Expression 12>

In the expression 12, the first term in the right side is proportional to the Coriolis force, and the second term in the right side is proportional to the viscosity-caused escaping component. In this way, β sin θ can be obtained from the expressions 10 and 11.

In the exemplary embodiment, for example, the driving frames 24a, 24b and the detecting frames 26a, 26b constitute vibrators, and the servo electrodes 29a through 30b as restricting electrodes constitute a restricting part. Also, the first and second driving electrodes 31a through 32b and the second driving beams 33a, 33b constitute a driving part, and the monitoring electrodes 34a through 35b and the monitoring beams 36a, 36b constitute a monitoring part.

Additional advantages and modifications will readily occur to those skilled in the art. The invention in its broader term is therefore not limited to the specific details, representative apparatus, and illustrative examples shown and described.

What is claimed is:

1. An angular velocity sensor comprising:
   a substrate;
   a vibrator;
   a beam part coupling the vibrator with the substrate such that the vibrator is movable in a first direction and a second direction that is perpendicular to the first direction;
   a driving part configured to vibrate the vibrator in the first direction;
   a detecting part configured to detect displacement of the vibrator in the second direction as a change in capacitance, the displacement of the vibrator in the second direction being caused by Coriolis force generated in the vibrator due to vibration of the vibrator and an angular velocity around a third direction that is perpendicular to the first direction and the second direction; and a restricting part configured to restrict displacement of the vibrator in the second direction based on the change in capacitance, wherein the angular velocity sensor is configured such that a detuning degree α and a Q-value $Q_s$ in the second direction satisfy a relation that is defined by one of following expression 1 and expression 2, when the Q-value $Q_s$ is equal to or less than 3, the detuning degree α being defined by $f_s/f_d$ in which $f_s$ is resonance frequency in the second direction and $f_d$ is resonance frequency in the first direction, and the Q-value $Q_s$ being defined by $(mk_s)^{0.5}/c_s$, in which m is a mass of the vibrator, $k_s$ is a spring constant of the beam part in the second direction, and $c_s$ is an attenuation constant of the vibrator in the second direction, wherein the expression 1 is $$\alpha \geq -0.0992 Q_s^2 + 0.4874 Q_s + 0.6592$$

wherein the expression 2 is $$\alpha \leq 0.0916 Q_s^2 - 0.4795 Q_s + 1.4794$$

wherein the vibrator is one of a pair of vibrators, each of the pair of vibrators includes a driving frame having a frame shape and a detecting frame having a frame shape and surrounded by the driving frame, the beam part includes a driving beam, a detecting beam and a coupling beam, the driving beam couples the driving frame with the substrate, the detecting beam couples the driving frame with the detecting frame, the coupling beam couples the driving frame of one of the vibrators with the driving frame of the other of the vibrators, the driving part includes a first driving electrode and a second driving electrode, the first driving electrode is provided on an outer portion of the driving frame, the second driving electrode is provided on the substrate at a portion outside of the driving frame, the detecting part includes a first detecting electrode and a second detecting electrode, the restricting part includes a first restricting electrode and a second restricting electrode, the first detecting electrode and the first restricting electrode are provided on an inner portion of the detecting frame, and the second detecting electrode and the second restricting electrode are provided on the substrate at portions surrounded by the detecting frame.

2. The angular velocity sensor according to claim 1, further comprising:

a monitoring part configured to monitor a vibrating state of the driving frame, wherein the monitoring part includes a first monitoring electrode and a second monitoring electrode, the first monitoring electrode is provided on the driving frame of each of the pair of vibrators, and the second monitoring electrode is opposed to the first monitoring electrode in the second direction.

3. An angular velocity sensor comprising:
a substrate;
a vibrator;
a beam part coupling the vibrator with the substrate such that the vibrator is movable in a first direction and a second direction that is perpendicular to the first direction;

a driving part configured to vibrate the vibrator in the first direction;

a detecting part configured to detect displacement of the vibrator in the second direction as a change in capacitance, the displacement of the vibrator in the second direction being caused by Coriolis force generated in the vibrator due to vibration of the vibrator and an angular velocity around a third direction that is perpendicular to the first direction and the second direction; and a restricting part configured to restrict displacement of the vibrator in the second direction based on the change in capacitance, wherein the angular velocity sensor is configured such that a detuning degree α and a Q-value $Q_s$ in the second direction satisfy a relation that is defined by one of following expression 3 and expression 4, when the Q-value $Q_s$ is equal to or higher than 3, the detuning degree α being defined by $f_s/f_d$ in which $f_s$ is resonance frequency in the second direction and $f_d$ is resonance frequency in the first direction, and the Q-value $Q_s$ being defined by $(mk_s)^{0.5}/c_s$, in which m is a mass of the vibrator, $k_s$ is a spring constant of the beam part in the second direction, and $c_s$ is an attenuation constant of the vibrator in the second direction, wherein the expression 3 is $$\alpha \geq 1.2878 Q_s^{-0.0488}$$

the expression 4 is $$\alpha \leq 0.8233 Q_s^{0.0344}$$

wherein the vibrator is one of a pair of vibrators, each of the pair of vibrators includes a driving frame having a frame shape and a detecting frame having a frame shape and surrounded by the driving frame, the beam part includes a driving beam, a detecting beam and a coupling beam, the driving beam couples the driving frame with the substrate, the detecting beam couples the driving frame with the detecting frame, the coupling beam couples the driving frame of one of the vibrators with the driving frame of the other of the vibrators, the driving part includes a first driving electrode and a second driving electrode, the first driving electrode is provided on an outer portion of the driving frame, the second driving electrode is provided on the substrate at a portion outside of the driving frame, the detecting part includes a first detecting electrode and a second detecting electrode, the restricting part includes a first restricting electrode and a second restricting electrode, the first detecting electrode and the first restricting electrode are provided on an inner portion of the detecting frame, and the second detecting electrode and the second restricting electrode are provided on the substrate at portions surrounded by the detecting frame.

4. The angular velocity sensor according to claim 3, further comprising:

a monitoring part configured to monitor a vibrating state of the driving frame, wherein the monitoring part includes a first monitoring electrode and a second monitoring electrode, the first monitoring electrode is provided on the driving frame of each of the pair of vibrators, and the second monitoring electrode is opposed to the first monitoring electrode in the second direction.

\* \* \* \* \*